United States Patent
Wang et al.

(10) Patent No.: US 10,972,999 B2
(45) Date of Patent: Apr. 6, 2021

(54) METHOD FOR DETERMINING PAGING AREA, ACCESS NETWORK NODE AND CORE NETWORK NODE

(71) Applicant: CHINA ACADEMY OF TELECOMMUNICATIONS TECHNOLOGY, Beijing (CN)

(72) Inventors: Hucheng Wang, Beijing (CN); Shanzhi Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 1 day.

(21) Appl. No.: 16/340,577

(22) PCT Filed: Sep. 20, 2017

(86) PCT No.: PCT/CN2017/102375
§ 371 (c)(1),
(2) Date: Apr. 9, 2019

(87) PCT Pub. No.: WO2018/068614
PCT Pub. Date: Apr. 19, 2018

(65) Prior Publication Data
US 2019/0239188 A1  Aug. 1, 2019

(30) Foreign Application Priority Data
Oct. 11, 2016 (CN) .......................... 201610887826.3

(51) Int. Cl.
*H04W 68/02* (2009.01)
*H04W 76/27* (2018.01)
(Continued)

(52) U.S. Cl.
CPC ............. *H04W 68/02* (2013.01); *H04W 8/08* (2013.01); *H04W 68/005* (2013.01);
(Continued)

(58) Field of Classification Search
CPC ....................................................... H04W 68/02
See application file for complete search history.

(56) References Cited

U.S. PATENT DOCUMENTS 9,578,567 B1*  2/2017  Laganier ............... H04W 36/24
2019/0215800 A1*  7/2019  Fujishiro ............... H04W 68/00

FOREIGN PATENT DOCUMENTS

CN   105188137 A   12/2015
CN   105744621 A   7/2016
(Continued)

OTHER PUBLICATIONS

Asustek., "On the paging area management for light connection", 3GPP TSG-RAN WG 2 Meeting #95 R2-165303, Aug. 26, 2016 (Aug. 26, 2016), section 2.2, and figure 1.
(Continued)

*Primary Examiner* — Edan Orgad
*Assistant Examiner* — Won Tae C Kim
(74) *Attorney, Agent, or Firm* — Ladas & Parry, LLP

(57) ABSTRACT

The present disclosure provides a method for determining a paging area, an access network node and a core network node. The method for use in the access network node includes: acquiring indication information indicating the allocation of the paging area for a UE; determining the paging area for the UE in accordance with the indication information; and notifying the UE of the paging area.

18 Claims, 9 Drawing Sheets

(51) Int. Cl.
*H04W 76/30* (2018.01)
*H04W 92/10* (2009.01)
*H04W 8/08* (2009.01)
*H04W 68/00* (2009.01)

(52) U.S. Cl.
CPC .......... *H04W 76/27* (2018.02); *H04W 76/30* (2018.02); *H04W 92/10* (2013.01)

(56) References Cited

FOREIGN PATENT DOCUMENTS

| CN | 105848223 A | 8/2016 |
|---|---|---|
| WO | 2016091322 A1 | 6/2016 |

OTHER PUBLICATIONS

China Telecom., "Discussion on the paging area for light connection", 3GPP TSG RAN WG 2 Meeting #94 R2-163860, May 27, 2016 (May 27, 2016), entire document.
Huawei et al., "Signaling reduction to enable light connection for LTE", 3GPP TSG RAN meeting #73 RP-161805, Sep. 22, 2016 (Sep. 22, 2016), entire document.
"RAN initiated Paging Solution", 3GPP TSG-RAN 3 Meeting #92 R3-161167, May 27, 2016 (May 27, 2016), entire document.
International Search Report for PCT/CN2017/102375 dated Dec. 8, 2017 and its English translation provided by WIPO.
Written Opinion of the International Searching Authority for PCT/CN2017/102375 dated Dec. 8, 2017 and its English translation provided by Google Translate.
Notice of Reasons for Refusal from JP app. No. 2019-540480, dated Mar. 24, 2020, with English translation from Global Dossier.
"UE specific Paging area definition", R2-166732, 3GPP TSG RAN WG2 NB-Meeting #95bis, Kaoshing, Taiwan, Oct. 10-14, 2016.
"NR RRC Inactive State principles", R2-167062, 3GPP TSG RAN WG2 Meeting #95bis, Kaoshing, Taiwan, Oct. 10-14, 2016.
"Solution: Mobility Options", S2-161625, SA WG2 Meeting #S2-114, Sophia, Antipolis, FR, Apr. 11-15, 2016.
"The procedure to activate RRC inactive connected mode", S2-164563, SA WG2 Meeting #52-116BIS, Sanya, P.R. China, Aug. 29-Sep. 2, 2016.
First office action and search report from CN app. No. 201610887826.3, dated Dec. 27, 2018, with English translation provided by Global Dossier.
Extended European Search Report from EP app. No. 17860229.8, dated Aug. 22, 2019.
International Preliminary Report on Patentability from PCT/CN2017/102375, dated Apr. 16, 2019, with English translation provided by WIPO.
Written Opinion of the International Searching Authority from PCT/CN2017/102375, dated Dec. 8, 2017, with English translation provided by WIPO.
"RAN-initiated Paging in Light Connection", R2-165215, 3GPP TSG-RAN WG2 Meeting #95, Goteborg, Sweden, Aug. 22-26, 2016.
"Signalling and Procedures for states transition and PAU", R2-166629, 3GPP TSG-RAN WG2 Meeting #95bis, Kaohsiung, Oct. 10-14, 2016.
"Ran-based paging area for light connection", R2-166689, 3GPP TSG RAN WG2 Meeting #95bis, Kaohsiung, Oct. 10-14, 2016.
"S1 impacts for Light Connection", R3-162160, 3GPP TSG-RAN3 Meeting #93, Sophia-Antipolis, France, Oct. 10-14, 2016.
"On common and specific building blocks for light connected UEs", R3-162432, 3GPP TSG-RAN WG3 Meeting #93bis, Sophia-Antipolis, France, Oct. 10-14, 2016.
"The procedure to activate RRC inactive connected mode", S2-164563, SA WG2 Meeting #52-116BIS, Sanya, China, Aug. 29-Sep. 2, 2016.

* cited by examiner

METHOD FOR DETERMINING PAGING AREA, ACCESS NETWORK NODE AND CORE NETWORK NODE

CROSS-REFERENCE TO RELATED APPLICATIONS

The present application is the U.S. national phase of PCT Application No. PCT/CN2017/102375 filed on Sep. 20, 2017, which claims a priority to the Chinese patent application 201610887826.3 filed on Oct. 11, 2016, the disclosures of which are incorporated herein by reference in their entireties.

TECHNICAL FIELD

The present disclosure relates to the field of communication technology, in particular to a method for determining a paging area, an access network node and a core network node.

BACKGROUND

As shown in FIG. 1, architecture of a Next-Generation (NextGen) network mainly consists of User Equipment (UEs), Radio Access Network (RAN) nodes and a NextGen core network. The NextGen core network includes control plane (CP) functions and user plane (UP) functions. Each UE is connected to the CP functions via an NG1 interface. Each RAN node is connected to the CP functions via an NG2 interface and to the UP functions via an NG3 interface. The CP functions are connected to the UP functions via an NG4 interface and to an application service function (AF) via an NG5 interface, and the UP functions are connected to a data network (DN) via an NG6 interface.

A new mobility state, i.e., a radio resource control (RRC)_inactive_connected state, has been introduced into Technical Report (TR) 23.799. When the UE is in this state, the connection to the UE via the NG2 and NG3 interfaces is still maintained, although an RRC connection to the UE has been released by the RAN node.

In this state, the UE is transparent to the core network, i.e., the core network still considers that the UE is always in the connected state, so downlink signaling or data may arrive at the RAN node. At this time, it is necessary for the RAN node to page the UE.

As shown in FIG. 2, as defined in the TR 23.799, a method for determining an RAN level paging area includes the following steps.

Step 1: at the UE, information about an area where the UE is expected to reside for a long time period is carried in a service request message.

Step 2: the NG core network determines an intended area in accordance with an UE's expectation, UE's subscription and a network configuration, and in the use of a UP, negotiates with an RAN for an area where the UE is allowed to reside for a long time period in the RRC_inactive_connected state. Then, the NG core network determines the negotiated area as Long Connected Allowed Area, and notifies it to the UE.

Step 3: the UE enters an RRC inactive mode.

Step 4: when the UE has moved beyond the Long Connected Allowed Area, the UE notifies the NG core network to update or delete the Long Connected. Allowed Area.

It should be appreciated that, in the related art, when the UE has moved beyond a current RAN level paging area, it is impossible to update or reallocate the paging area, so the network communication may be adversely affected.

SUMMARY

An object of the present disclosure is to provide a method for determining a paging area, an access network node and a core network node, so as to update or reallocate the paging area after the UE has moved beyond the current RAN level paging area, thereby to improve the network communication.

In one aspect, the present disclosure provides in some embodiments a method for determining a paging area for use in an access network node, including: acquiring indication information indicating the allocation of the paging area for a UE; determining the paging area for the UE in accordance with the indication information; and notifying the UE of the paging area.

In some possible embodiments of the present disclosure, the indication information is information about an area in which the UE is allowed to be in an RRC inactive state, or an indication indicating that the UE is allowed to be in the RRC inactive state.

In some possible embodiments of the present disclosure, when the indication information is the indication indicating that the UE is allowed to be in the RRC inactive state, the determining the paging area for the UE in accordance with the indication information includes determining a cell-granularity-based paging area for the UE in accordance with the indication indicating that the UE is allowed to be in the RRC inactive state.

In some possible embodiments of the present disclosure, when the indication information is the information about the area in which the UE is allowed to the in the RRC inactive state, the determining the paging area for the UE in accordance with the indication information includes determining a cell-granularity-based paging area for the UE in accordance with the information about the area in which the UE is allowed to be in the RRC inactive state, and the determined cell-granularity-based paging area is included in the area in which the UE is allowed to be in the RRC inactive state.

In some possible embodiments of the present disclosure, the determining the cell-granularity-based paging area for the UE includes: acquiring network deployment and configuration at the access network node as well as information about a mobility feature of the UE; and determining the cell-granularity-based paging area for the UE in accordance with the network deployment and configuration as well as the information about the mobility feature of the UE.

In some possible embodiments of the present disclosure, the notifying the UE of the paging area includes directly transmitting the paging area to the UE via an air-interface message.

In some possible embodiments of the present disclosure, the method further includes, when the UE is connected to the access network node again, determining, by the access network node, a new paging area for the UE.

In some possible embodiments of the present disclosure, the acquiring the indication information indicating the allocation of the paging area for the UE includes acquiring the indication information indicating the allocation of the paging area for the UE which is transmitted by a core network node upon the receipt of a position update request from the UE.

In some possible embodiments of the present disclosure, the notifying the UE of the paging area includes: transmitting the paging area to the core network node so that the core network node transmits the paging area to the UE; or directly transmitting the paging area to the UE via an air-interface message.

In some possible embodiments of the present disclosure, the acquiring the indication information indicating the allocation of the paging area for the UE includes receiving the indication information indicating the allocation of the paging area for the UE which is transmitted after the UE has moved beyond a current paging area.

In some possible embodiments of the present disclosure, the determining the paging area for the UE in accordance with the indication information includes: determining whether the UE is allowed to be in the RRC inactive state in accordance with the indication information; and when the UE is allowed to be in the RRC inactive state, determining the paging area for the UE.

In some possible embodiments of the present disclosure, the determining whether the UE is allowed to be in the RRC inactive state in accordance with the indication information includes: acquiring the information about the area in which the UE is allowed to be in the RRC inactive state in accordance with the indication information; and determining whether the UE is allowed to be in the RRC inactive state in accordance with the information about the area in which the UE is allowed to be in the RRC inactive state.

In some possible embodiments of the present disclosure, the acquiring the information about the area in which the UE is allowed to be in the RRC inactive state in accordance with the indication information includes: transmitting a request to a first access network node so as to acquire the information about the area in which the UE is allowed to be in the RRC inactive state; or transmitting a request to the core network node so as to acquire the information about the area in which the UE is allowed to be in the RRC inactive state.

In some possible embodiments of the present disclosure, the method further includes, when the UE is not allowed to be in the RRC inactive state, transmitting an RRC inactive state deactivation message to the core network node, so that the core network node notifies the UE that the UE is not allowed to be in the RRC inactive state any longer.

In some possible embodiments of the present disclosure, when the UE is allowed to be in the RRC inactive state, subsequent to determining the paging area for the UE, the method further includes transmitting a path switching request to the core network node, so that the core network node updates a user plane connection and a control plane connection between the access network node and the core network node for the UE.

In some possible embodiments of the present disclosure, the notifying the UE of the paging area includes directly transmitting the paging area to the UE via an air-interface message.

In another aspect, the present disclosure provides in some embodiments an access network node, including: a first acquisition module configured to acquire indication information indicating the allocation of the paging area for a UE; a first determination module configured to determine the paging area for the UE in accordance with the indication information; and a notification module configured to notify the UE of the paging area.

In some possible embodiments of the present disclosure, the indication information is information about an area in which the UE is allowed to be in an RRC inactive state, or an indication indicating that the UE is allowed to be in the RRC inactive state.

In some possible embodiments of the present disclosure, when the indication information is the indication indicating that the UE is allowed to be in the RRC inactive state, the first determination module is configured to determine a cell-granularity-based paging area for the UE in accordance with the indication indicating that the UE is allowed to be in the RRC inactive state.

In some possible embodiments of the present disclosure, when the indication information is the information about the area in which the UE is allowed to the in the RRC inactive state, the first determination module is configured to determine a cell-granularity-based paging area for the UE in accordance with the information about the area in which the UE is allowed to be in the RRC inactive state, and the determined cell-granularity-based paging area is included in the area in which the UE is allowed to be in the RRC inactive state.

In some possible embodiments of the present disclosure, the first determination module is further configured to: acquire network deployment and configuration at the access network node as well as information about a mobility feature of the UE; and determine the cell-granularity-based paging area for the UE in accordance with the network deployment and configuration as well as the information about the mobility feature of the UE.

In some possible embodiments of the present disclosure, the notification module is further configured to directly transmit the paging area to the UE via an air-interface message.

In some possible embodiments of the present disclosure, the access network node further includes a second determination module configured to, when the UE is connected to the access network node again, determine a new paging area for the UE.

In some possible embodiments of the present disclosure, the first acquisition module is further configured to acquire the indication information indicating the allocation of the paging area for the UE which is transmitted by a core network node upon the receipt of a position update request from the UE.

In some possible embodiments of the present disclosure, the notification module is further configured to transmit the paging area to the core network node so that the core network node transmits the paging area to the UE, or directly transmit the paging area to the UE via an air-interface message.

In some possible embodiments of the present disclosure, the first acquisition module is further configured to receive the indication information indicating the allocation of the paging area for the UE which is transmitted after the UE has moved beyond a current paging area.

In some possible embodiments of the present disclosure, the first determination module includes: a determination sub-module configured to determine whether the UE is allowed to be in the RRC inactive state in accordance with the indication information; and a first determination sub-module configured to, when the UE is allowed to be in the RRC inactive state, determine the paging area for the UE.

In some possible embodiments of the present disclosure, the determination sub-module includes: an acquisition unit configured to acquire the information about the area in which the UE is allowed to be in the RRC inactive state in accordance with the indication information; and a determination unit configured to determine whether the UE is allowed to be in the RRC inactive state in accordance with the information about the area in which the UE is allowed to be in the RRC inactive state.

In some possible embodiments of the present disclosure, the acquisition unit is further configured to transmit a request to a first access network node so as to acquire the information about the area in which the UE is allowed to be in the RRC inactive state, or transmit a request to the core network node so as to acquire the information about the area in which the UE is allowed to be in the RRC inactive state.

In some possible embodiments of the present disclosure, the first determination module further includes a first transmission sub-module configured to, when the UE is not allowed to be in the RRC inactive state, transmit an RRC inactive state deactivation message to the core network node, so that the core network node notifies the UE that the UE is not allowed to be in the RRC inactive state any longer.

In some possible embodiments of the present disclosure, the access network node further includes a first transmission module configured to transmit a path switching request to the core network node, so that the core network node updates a user plane connection and a control plane connection between the access network node and the core network node for the UE.

In some possible embodiments of the present disclosure, the notification module is further configured to directly transmit the paging area to the UE via an air-interface message.

In yet another aspect, the present disclosure provides in some embodiments a method for determining a paging area for use in a core network node, including: acquiring a position update request from a UE; determining whether the UE is allowed to be in an RRC inactive state in accordance with the position update request; and when the UE is allowed to be in the RRC inactive state, transmitting indication information indicating the allocation of the paging area for the UE to an access network node.

In some possible embodiments of the present disclosure, the indication information is information about an area in which the UE is allowed to be in an RRC inactive state, or an indication indicating that the UE is allowed to be in the RRC inactive state.

In some possible embodiments of the present disclosure, the acquiring the position update request from the UE includes receiving the position update request from the UE after the UE has moved beyond a current paging area, and the indication information indicating that the UE has moved beyond the current paging area is carried in the position update request.

In some possible embodiments of the present disclosure, when the indication information includes the information about the area in which the UE is allowed to be in the RRC inactive state, the transmitting the indication information indicating the allocation of the paging area for the UE to the access network node includes: determining the information about the area in which the UE is allowed to be in the RRC inactive state; and transmitting the information about the area as the indication information indicating the allocation of the paging area for the UE to the access network node.

In some possible embodiments of the present disclosure, prior to determining whether the UE is allowed to be in the RRC inactive state in accordance with the position update request, the method further includes: determining whether the UE is located in an area in which the UE is allowed to be in the RRC inactive state; when the UE is located in the area in which the UE is allowed to be in the RRC inactive state, determining whether the UE is allowed to be in the RRC inactive state in accordance with the position update request; and when the UE is located in an area in which the UE is not allowed to be in the RRC inactive state, transmitting a response message to the UE, so as to notify the UE that the UE is not allowed to be in the RRC inactive state any longer.

In some possible embodiments of the present disclosure, the method further includes: receiving the paging area from the access network node; and transmitting the paging area to the UE.

In still yet another aspect, the present disclosure provides in some embodiments a core network node, including: a second acquisition module configured to acquire a position update request from a UE; a third determination module configured to determine whether the UE is allowed to be in an RRC inactive state in accordance with the position update request; and a second transmission module configured to, when the UE is allowed to be in the RRC inactive state, transmit indication information indicating the allocation of the paging area for the UE to an access network node.

In some possible embodiments of the present disclosure, the indication information is information about an area in which the UE is allowed to be in an RRC inactive state, or an indication indicating that the UE is allowed to be in the RRC inactive state.

In some possible embodiments of the present disclosure, the second acquisition module is further configured to receive the position update request from the UE after the UE has moved beyond a current paging area, and the indication information indicating that the UE has moved beyond the current paging area is carried in the position update request.

In some possible embodiments of the present disclosure, when the indication information includes the information about the area in which the UE is allowed to be in the RRC inactive state, the second transmission module includes: a second determination sub-module configured to determine the information about the area in which the UE is allowed to be in the RRC inactive state; and a second transmission sub-module configured to transmit the information about the area as the indication information indicating the allocation of the paging area for the UE to the access network node.

In some possible embodiments of the present disclosure, the core network node further includes: a determination module configured to determine whether the UE is located in an area in which the UE is allowed to be in the RRC inactive state; and a message returning module configured to, when the UE is located in an area in which the UE is not allowed to be in the RRC inactive state, transmit a response message to the UE, so as to notify the UE that the UE is not allowed to be in the RRC inactive state any longer. The third determination module is further configured to, when the UE is located in the area in which the UE is allowed to be in the RRC inactive state, determine whether the UE is allowed to be in the RRC inactive state in accordance with the position update request.

In some possible embodiments of the present disclosure, the core network node further includes a reception module configured to receive the paging area from the access network node, and a third transmission module configured to transmit the paging area to the UE.

In still yet another aspect, the present disclosure provides in some embodiments an access network node, including a processor, and a memory and a transceiver connected to the processor. The memory is configured to store therein programs and data for the operation of the processor. The processor is configured to call and execute the programs and data stored in the memory, so as to: acquire indication information indicating the allocation of the paging area for a UE; determine the paging area for the UE in accordance with the indication information; and notify through the transceiver the UE of the paging area.

In still yet another aspect, the present disclosure provides in some embodiments a core network node, including a processor, and a memory and a transceiver connected to the processor. The memory is configured to store therein programs and data for the operation of the processor. The processor is configured to call and execute the programs and data stored in the memory, so as to: acquire a position update request from a UE; determine whether the UE is allowed to be in an RRC inactive state in accordance with the position update request; and when the UE is allowed to be in the RRC inactive state, transmit through the transceiver indication information indicating the allocation of the paging area for the UE to an access network node.

According to the embodiments of the present disclosure, the paging area is determined for the UE in accordance with the indication information indicating the allocation of the paging area for the UE. As a result, it is able to determine the paging area for the UE in the RRC inactive state, thereby to ensure the integrity of the network communication.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

In the related art, there is no scheme for updating or reallocating a paging area after a UE has moved beyond a current RAN level paging area, so the network communication may be adversely affected. An object of the present disclosure is to provide a method for determining a paging area, an access network node and a core network node, so as to solve the above-mentioned problem.

Figure 1:
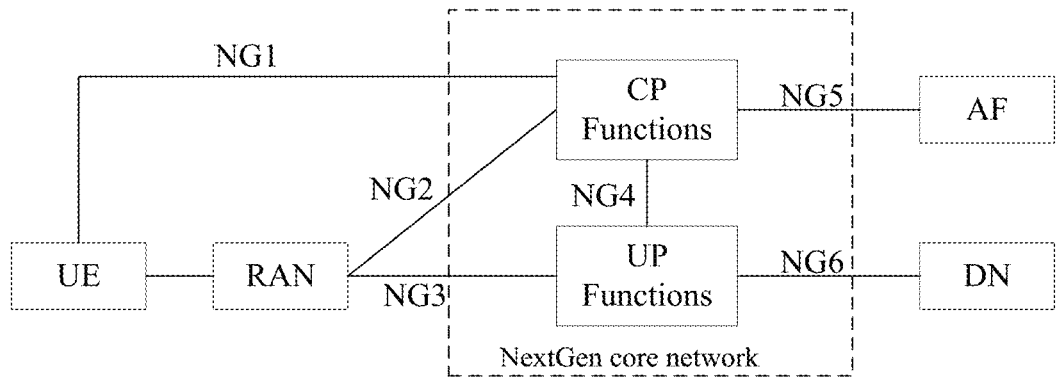
FIG. 1 is a schematic view showing architecture of a NextGen network.
Figure 2:
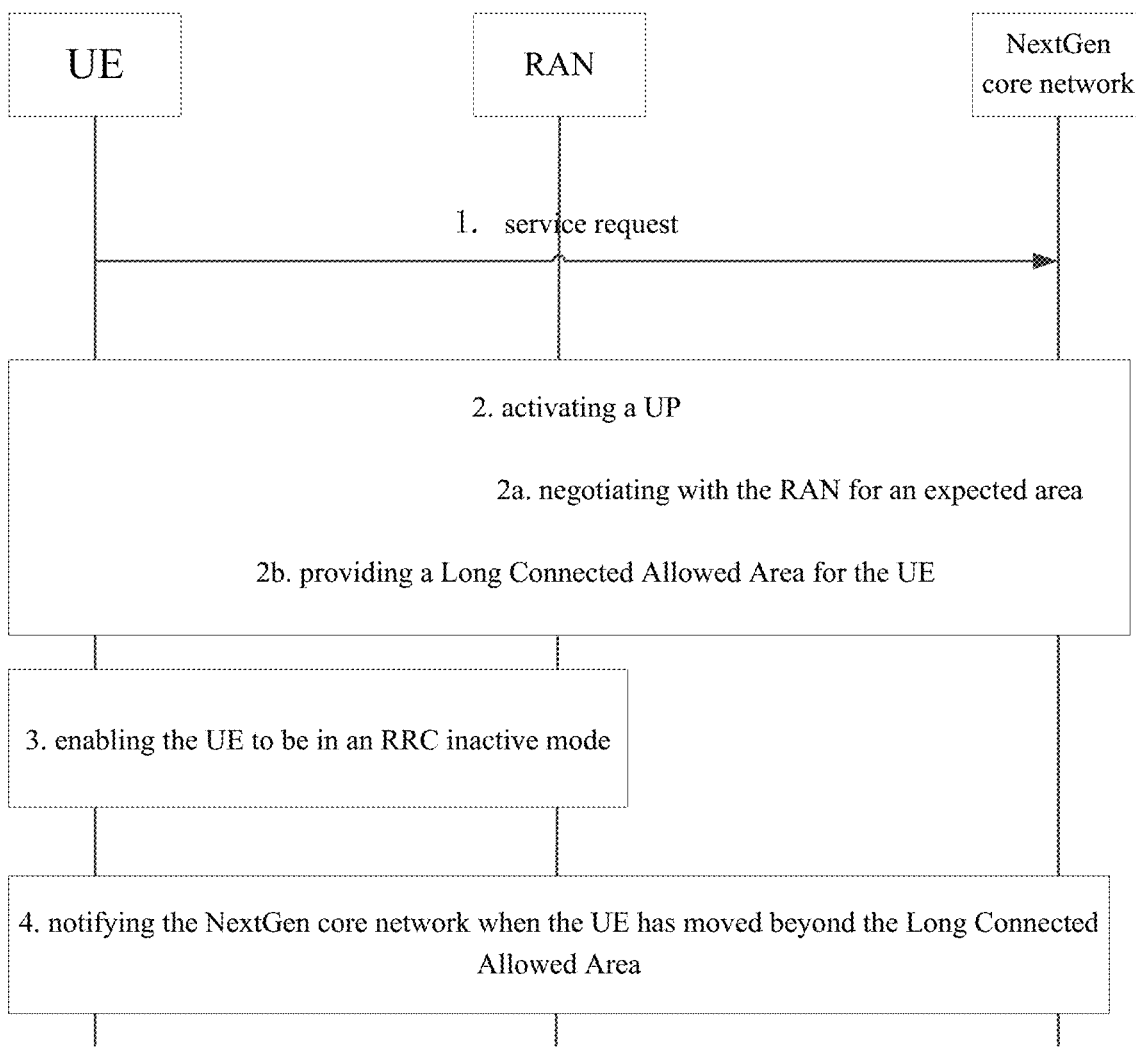
FIG. 2 is a schematic view showing a method for determining an RAN level paging area in the related art.
Figure 3:
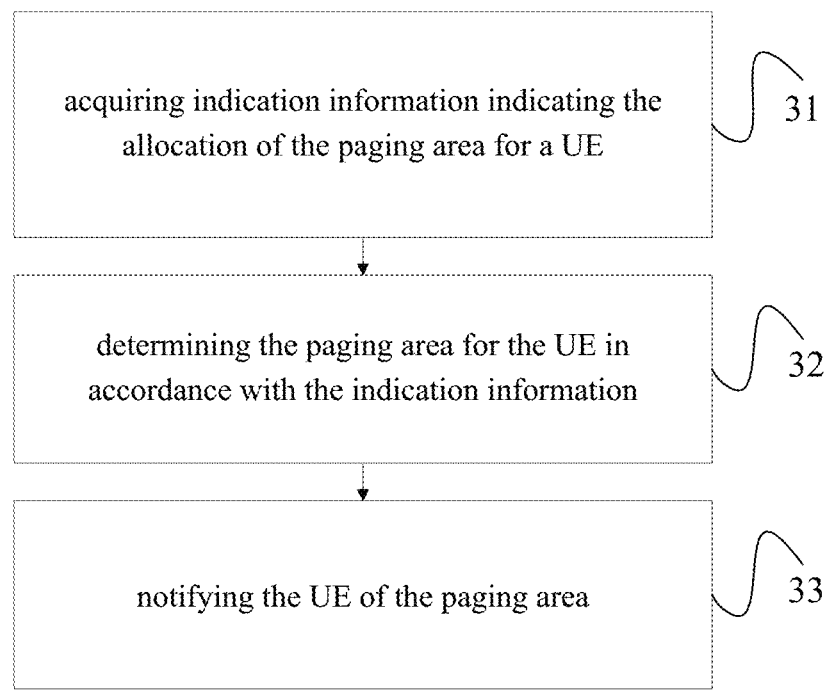
FIG. 3 is a flow chart of a method for determining a paging area according to some embodiments of the present disclosure.

As shown in FIG. 3, the present disclosure provides in some embodiments a method for determining a paging area for use in an access network node, which includes the following steps.

Step 31: acquiring indication information indicating the allocation of the paging area for a UE.

It should be appreciated that, this method is mainly adopted to determine an RAN level paging area for the UE in an RRC inactive state (i.e., the RRC_inactive_connected state mentioned in the background). The indication information may be transmitted by a core network node, or directly by the UE, to the access network node. It should be further appreciated that, when the UE is not in the RRC inactive state, the indication information may be adopted to indicate the allocation of the paging area for the UE, and when the UE has already been in the RRC inactive state, the indication information may be adopted to indicate the reallocation of the paging area for the UE (i.e., update the paging area at this time).

Step 32: determining the paging area for the UE in accordance with the indication information. In this step, when the access network node has received the indication information, the RAN level paging area may be determined for the UE in accordance with the indication information.

Step 33: notifying the UE of the paging area.

It should be appreciated that, the access network node in the embodiments of the present disclosure may refer to an access network node by which the UE is currently served.

According to the method in the embodiments of the present disclosure, the paging area for the UE is determined in accordance with the indication information indicating the allocation of the paging area for the UE. As a result, it is able to determine the RAN level paging area for the UE in the RRC inactive state, thereby to ensure the integrity of the network communication.

It should be appreciated that, the access network node may control the UE to be in the RRC inactive state when the UE is attached to a network, initiates a position update procedure or initiates a service request procedure, and allocate the RAN level paging area for the UE. At this time, the indication information may be information about an area in which the UE is allowed to be in the RRC inactive state or an indication indicating that the UE is allowed to be in the RRC inactive state. In this case, the access network node may directly transmit the paging area to the UE via an air-interface message (e.g., an RRC message). When the UE accesses to the access network node again, the access network node may re-determine the RAN level paging area for the UE.

In some possible embodiments of the present disclosure, the indication information may be the information about the area in which the UE is allowed to be in the RRC inactive state, or the indication indicating that the UE is allowed to be in the RRC inactive state.

It should be appreciated that, the indication indicating that the UE is allowed to be in the RRC inactive state may be an implicit indication, e.g., an indication indicating that the UE has low mobility or an indication indicating that the UE does not move.

To be specific, when the indication information is the information about the area in which the UE is allowed to the in the RRC inactive state, Step 32 may include determining a cell-granularity-based paging area for the UE in accordance with the information about the area in which the UE is allowed to be in the RRC inactive state. The determined cell-granularity-based paging area may be included in the area in which the UE is allowed to be in the RRC inactive state. It should be appreciated that, when the information about the area in which the UE is allowed to be in the RRC inactive state has been indicated by the core network node for the access network node, the access network node needs to select a part of the region indicated by the information as a new paging area for the UE.

To be specific, when the indication information is the indication indicating that the UE is allowed to be in the RRC inactive state, Step 32 may include determining a cell-granularity-based paging area for the UE in accordance with the indication indicating that the UE is allowed to be in the RRC inactive state.

It should be appreciated that, when the information about the area in which the UE is allowed to be in the RRC inactive state has been indicated h the core network node for the access network node, the access network node may directly determine the new paging area for the UE in accordance with information about mobility of the UE and information about a network side.

It should be appreciated that, the determining the cell-granularity-based paging area for the UE may principally include: acquiring network deployment and configuration at the access network node as well as information about a mobility feature of the UE; and determining the cell-granularity-based paging area for the UE in accordance with the network deployment and configuration as well as the information about the mobility feature of the UE.

The method will be described hereinafter in more details in some application scenarios.

Figure 4:
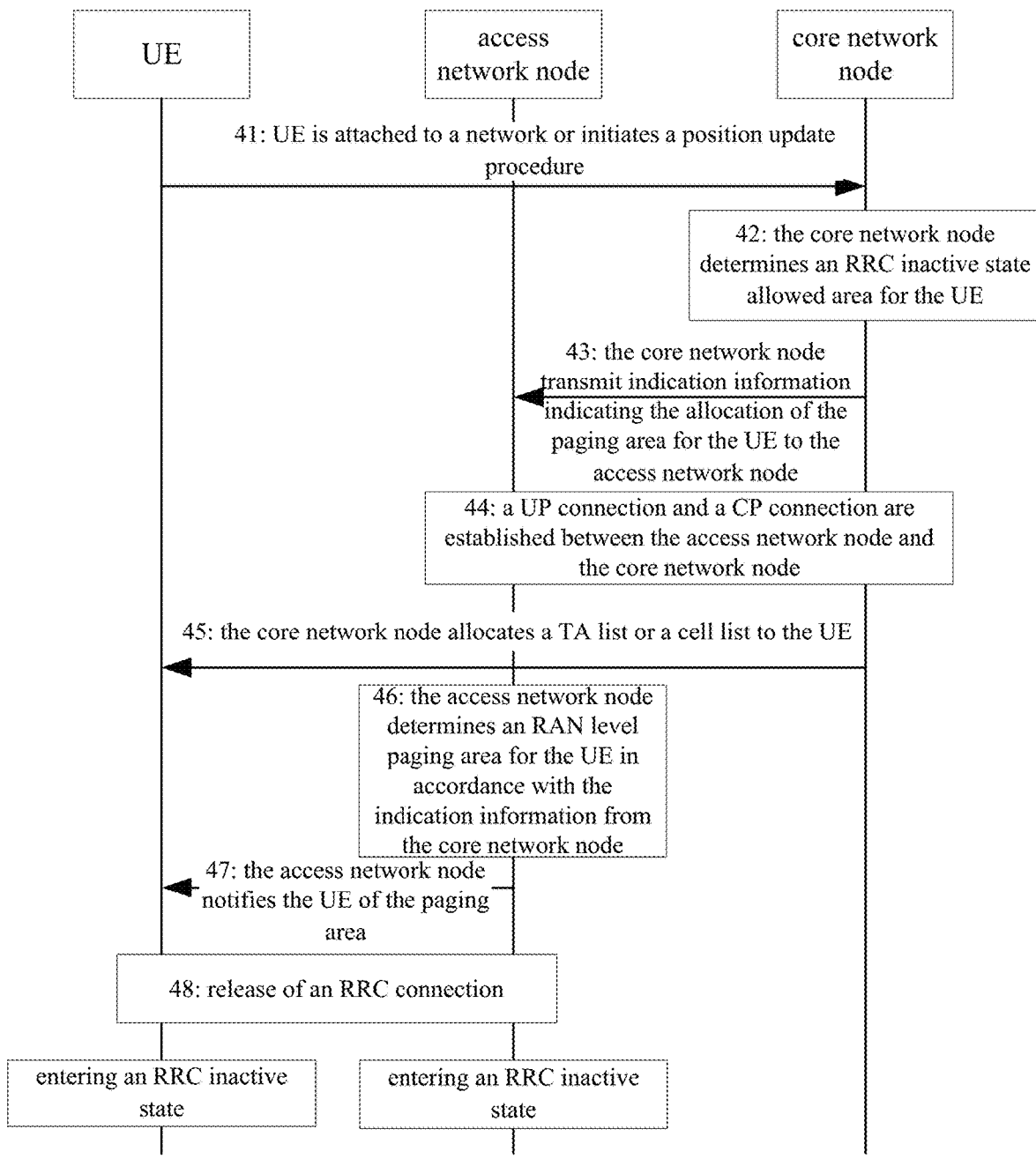
FIG. 4 is a schematic view showing a principal procedure of determining an RAN level paging area when a UE is attached to a network or initiates a position update procedure.

1. As shown in FIG. 4, a principal procedure of determining the RAN level paging area when the UE is attached to a network (i.e., an attachment procedure) or initiates a position update procedure (i.e., an Tracking Area Update (TAU) procedure) may include the following steps.

Step 41: the UE may be attached to the network or initiate the position update procedure.

Step 42: the core network node may determine an area in which the UE is allowed to be in the RRC inactive state.

The core network node (i.e., a node in the NextGen core network) may determine whether the UE is allowed to be in the RRC inactive connected (i.e., whether the UE is allowed to use an RRC inactive model or enters the RRC inactive connected state) in accordance with the mobility of the UE, the subscription of the UE as well as a network configuration and policy. When the UE is allowed to be in the RRC inactive connected state, the area in which the UE is allowed to be in the RRC inactive connected state may be determined and marked as an RRC inactive state allowed area, and a Tracking Area (TA) list or a cell list may be allocated so as to cover the RRC inactive allowed area.

Step 43: the core network node may transmit the indication information indicating the allocation of the paging area for the UE to the access network node.

The core network node may indicate the access network node, by which the UE is currently served, that the UE is allowed to be in the RRC inactive state. Further, the core network node (e.g., a Mobility Management Entity (MME)) may the area in which the UE is allowed to be in the RRC inactive state to an RAN node.

Step 44: a UP connection and a CP connection, i.e., a connection to an NG2 interface and a connection to an NG3 interface, may be established between the access network node and the core network node.

Step 45: the core network node may allocate the TA list or the cell list for the UE.

Step 46: the access network node may determine the RAN level paging area for the UE in accordance with the indication information from the core network node.

When the access network node has received the RRC inactive state allowed area, it may allocate a UE-specific RAN level paging area for the UE in accordance with network deployment and configuration at an access network side (e.g., an area which is capable of being served by the access network node as an anchor) as well as a mobility feature of the UE. Then, the access network node may determine that the UE is allowed to be in the RRC inactive connected state in this paging area. The RAN level paging area may be included in the RRC inactive state allowed area.

When the access network node has merely received the indication indicating that the UE is allowed to be in the RRC inactive state, the access network node may voluntarily allocate the UE-specific RAN level paging area for the UE in accordance with the network deployment and configuration at the access network side (e.g., the area which is capable of being served by the access network node as an anchor) as well as the mobility feature of the UE, and determine that the UE is allowed to be in the RRC inactive connected state in the paging area.

Step 47: the access network node may notify the UE of the paging area.

Step 48: after the release of an RRC connection, the UE and the access network node may be in the RRC inactive state.

Figure 5:
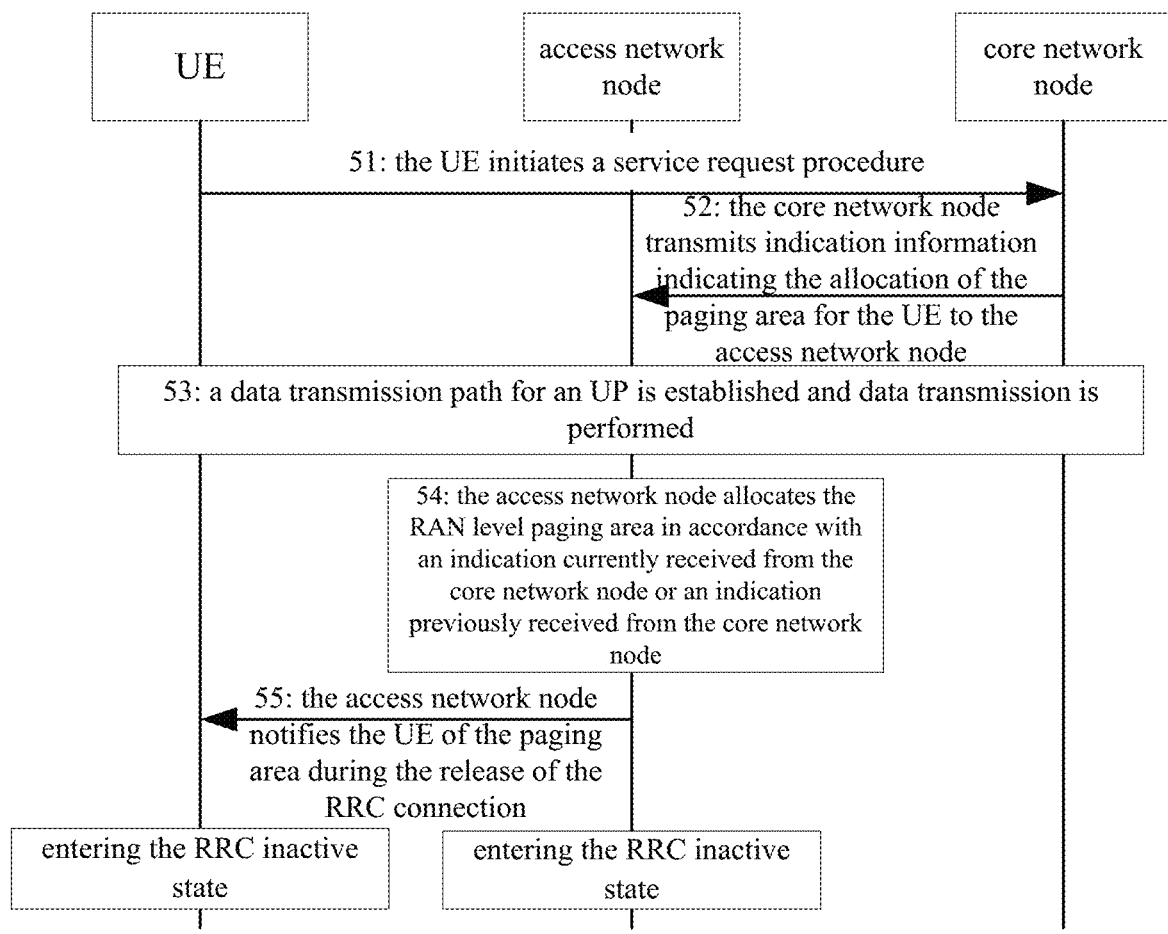
FIG. 5 is a schematic view showing a principal procedure of determining the RAN level paging area when the UE initiates a service request procedure.

2. As shown in FIG. 5, a principal procedure of determining the RAN level paging area when the UE initiates a service request procedure may include the following steps.

As an optional step, during the attachment procedure (without the establishment of a Packet Data Unit (PDU) session) or the TAU procedure, when the core network node (e.g., an MME) determines that the UE is capable of using the RRC inactive model or entering the RRC inactive connected state in accordance with the mobility of the UE, the subscription of the UE as well as the network configuration and policy, it may determine an area in which the UE is allowed to be in the RRC inactive connected state and mark it as an RRC inactive allowed area. At this time, the MME may not indicate the RAN to activate the RRC inactive state immediately.

Step 51: the UE may initiate the service request procedure.

Step 52: The core network node may transmit the indication information about the allocation of the paging area for the UE to the access network node.

The core network node may probably indicate an access network node by which the UE is currently served to the RAN node (this indication is optional, and when the MME has provided the indication to the RNA node during the attachment or TAU procedure, it is unnecessary to provide the indication at this time), and the UE is allowed to be in the RRC inactive state. Further, the MME may transmit the area in which the UE is allowed to be in the RRC inactive state to the RAN node.

Step 53: a data transmission path at the UP may be established and the data transmission may be performed.

Step 54: the access network node may allocate the RAN level paging area in accordance with the indication currently received from the core network node or an indication that was previously received.

When the RAN node has received the RRC inactive state allowed area, the RAN node may allocate the UE-specific RAN level paging area for the UE in accordance with the network deployment and configuration at the access network side (e.g., an area which is capable of being served by the access network node as an anchor) as well as the mobility feature of the UE, and determine that the UE is allowed to be in the RRC inactive connected state in the paging area. The RAN level paging area may be included in the RRC inactive allowed area.

When the access network node has merely received the indication indicating that the UE is allowed to be in the RRC inactive state, the access network node may voluntarily allocate the UE-specific RAN level paging area for the UE in accordance with the network deployment and configuration at the access network side (e.g., an area which is capable of being served by the access network node as an anchor) as well as the mobility feature of the UE, and determine that the UE is allowed to be in the RRC inactive connected state in the paging area.

Step 55: the access network node may notify the UE of the paging area during the release of the RRC connection, and after the RRC connection has been released, the UE and the access network node may be in the RRC inactive state.

In some possible embodiments of the present disclosure, when the UE has already been in the RRC inactive state and moved beyond the current paging area during the movement, the core network node may trigger the access network node to reallocate the paging area for the UE. In this case, Step 31 may include acquiring the indication information indicating the allocation of the paging area for the UE which is transmitted by a core network node upon the receipt of a position update request from the UE.

Correspondingly, Step 32 may include: transmitting the paging area to the core network node so that the core network node transmits the paging area to the UE; or directly transmitting the paging area to the UE via an air-interface message.

Figure 6:
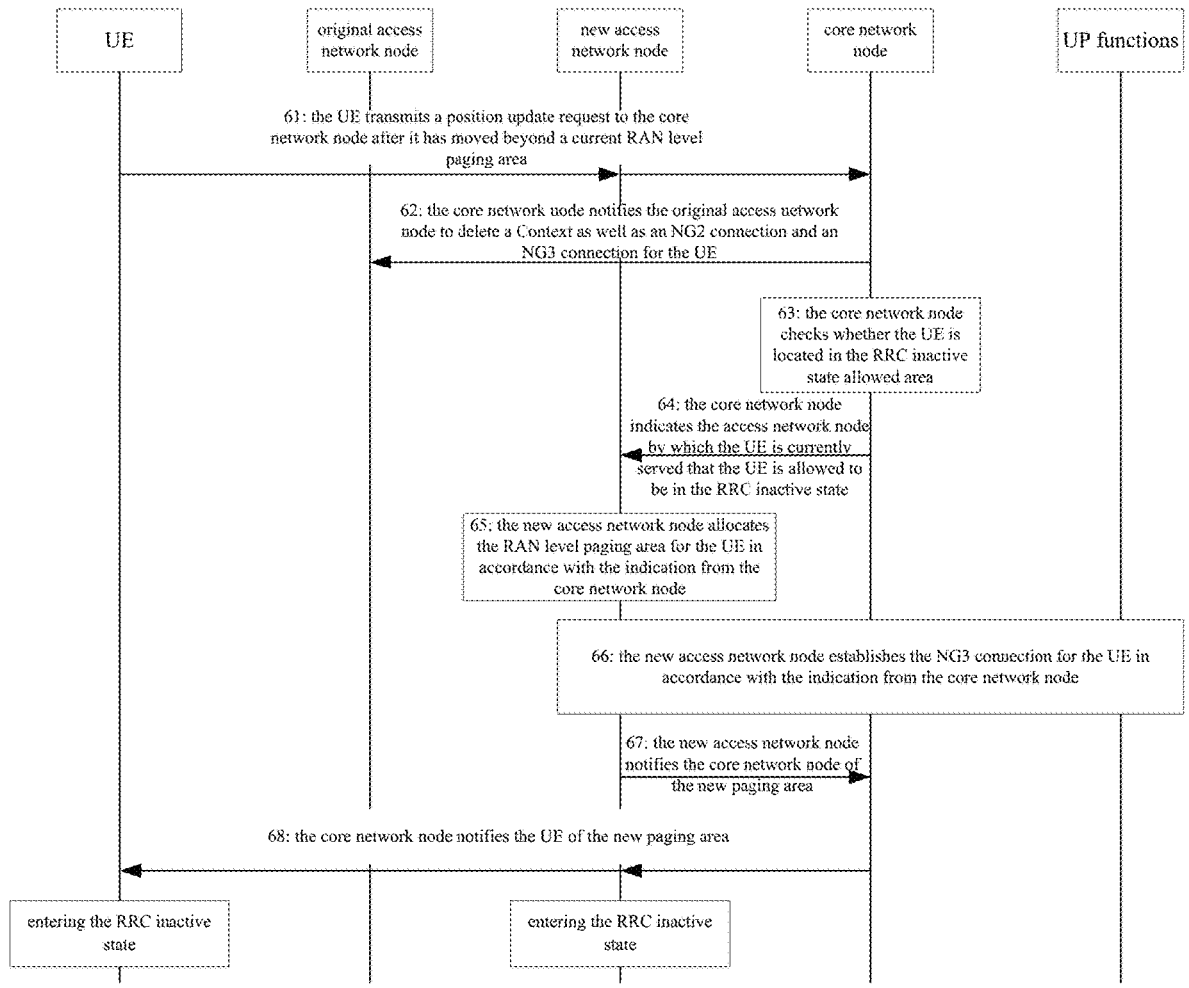
FIG. 6 is a schematic view showing a principal procedure of the reallocation of the RAN level paging area triggered by a core network node when the UE has moved beyond a current RAN level paging area according to some embodiments of the present disclosure.

3. As shown in FIG. 6, a principal procedure of the reallocation of the RAN level paging area triggered by the core network node when the UE has moved beyond the current RAN level paging area may include the following steps.

Step 61: after the UE has moved beyond the current RAN level paging area, the UE may transmit a position update request to the core network node, and an indication indicating that the UE has moved beyond the RAN level paging area may be carried in the position update request (when the RAN level paging area is not in alignment with the TA list or cell list).

Step 62: the core network node may at first notify an original access network node to delete a context of the UE as well as the NG2 and NG3 connections.

Step 63: the core network node may check whether the UE is still located in the RRC inactive state allowed area.

It should be appreciated that, Step 63 is optional. When the RAN level paging area is possibly greater than the TA list or cell list, Step 63 may be performed.

Step 64: the core network node may indicate an access network node by which the UE is currently served (i.e., a new access network node) that the UE is allowed to be in the RRC inactive state. Further, the core network node may transmit an area in which the UE is allowed to be in the RRC inactive state to the new access network node.

Step 65: the new access network node may allocate the UE-specific RAN level paging area for the UE in accordance with the indication from the core network node (i.e., the indication about the area in which the UE is allowed to be in the RRC inactive state), and determine that the UE is allowed to be in the RRC inactive connected state in the paging area.

Step 66: the new access network node may establish the NG3 connection for the UE in accordance with the indication from the core network node.

Step 67: the new access network node may notify the core network node of the paging area.

Step 68: the core network node may notify the UE of the newly-allocated paging area, so that the UE and the RAN node may enter the RRC inactive state after the release of the RRC connection.

Figure 7:
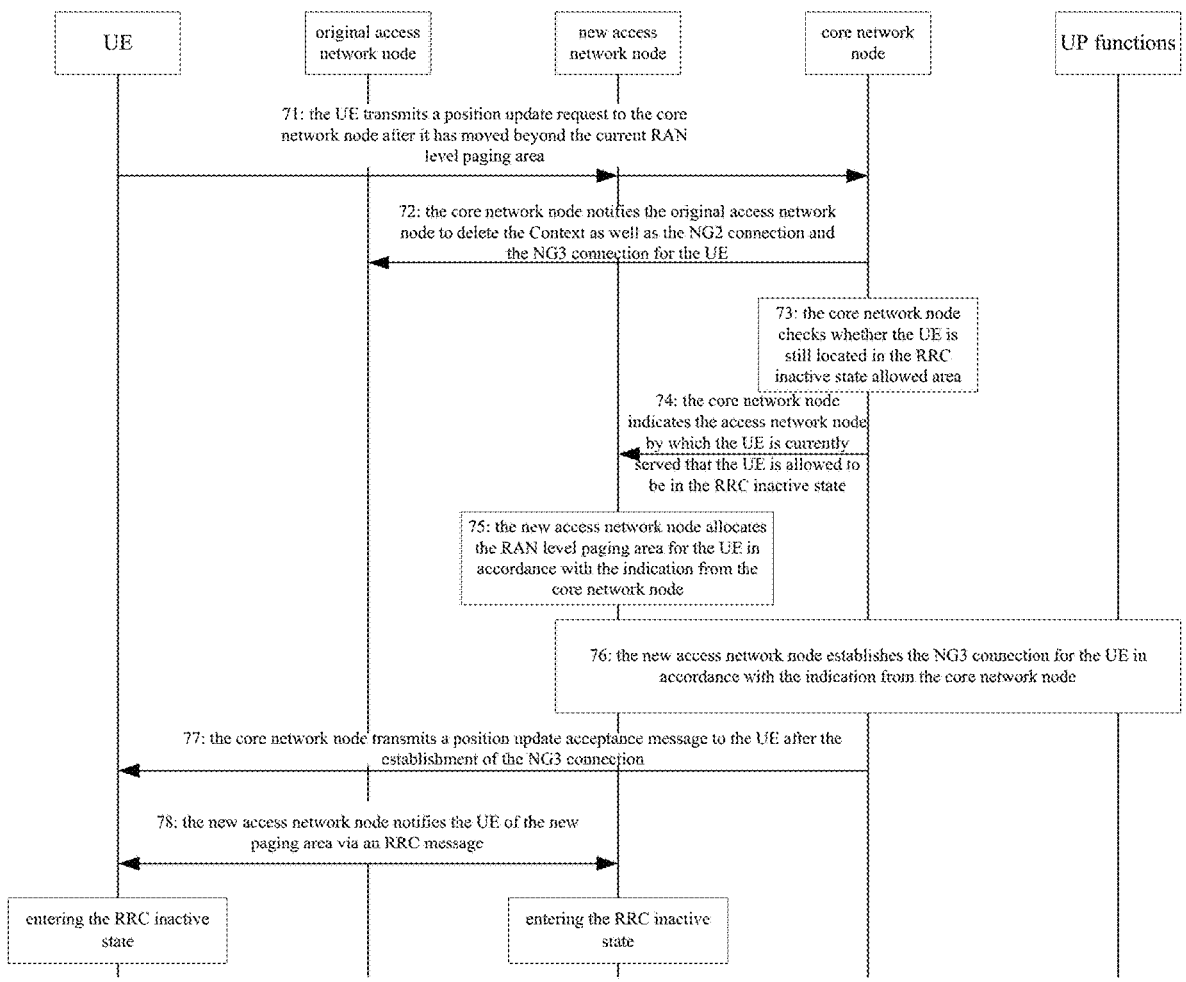
FIG. 7 is another schematic view showing the principal procedure of the reallocation of the RAN level paging area triggered by the core network node when the UE has moved beyond the current RAN level paging area according to some embodiments of the present disclosure.

4. As shown in FIG. 7, another principal procedure of the reallocation of the RAN level paging area triggered by the core network node when the UE has moved beyond the current RAN level paging area may include the following steps.

Step 71: after the UE has moved beyond the current RAN level paging area, the UE may transmit the position update request to the core network node. An indication indicating that the UE has moved beyond the RAN level paging area may probably be carried in the position update request (e.g., when the RAN level paging area is not in alignment with the TA list or cell list, the indication may be provided by the UE to the core network node).

Step 72: the core network node may at first notify an original access network node to delete a context of the UE as well as the NG2 and NG3 connections.

Step 73: the core network node may check whether the UE is still located in the RRC inactive state allowed area.

It should be appreciated that, Step 73 is optional. When the RAN level paging area is possibly greater than the TA list or cell list, Step 73 may be performed.

Step 74: the core network node may indicate an access network node by which the UE is currently served (i.e., a new access network node) that the UE is allowed to be in the RRC inactive state. Further, the core network node may transmit an area in which the UE is allowed to be in the RRC inactive state to the new access network node.

Step 75: the new access network node may allocate the UE-specific RAN level paging area for the UE in accordance with the indication from the core network node (i.e., the indication about the area in which the UE is allowed to be in the RRC inactive state), and determine that the UE is allowed to be in the RRC inactive connected state in the paging area.

Step 76: the new access network node may establish the NG3 connection for the UE in accordance with the indication from the core network node.

Step 77: after the establishment of the NG3 connection, the core network node may transmit a position update accepted message to the UE.

Step 78: the new access network node may notify the UE of the new paging area via an RRC message, e.g., an RRC connection release message, so that the UE and the access network node by which the UE is currently served may enter the RRC inactive state after the release of the RRC connection.

In some possible embodiments of the present disclosure, when the UE has already been in the RRC inactive state and moved beyond the current paging area during the movement, the access network node may be directly trigged to reallocate the paging area for the UE. In this case, Step 31 may include receiving the indication information indicating the allocation of the paging area for the UE which is transmitted after the UE has moved beyond a current paging area.

It should be appreciated that, the indication information may be included in a request message transmitted by the UE, or a new message transmitted by the UE.

It should be further appreciated that, when the indication information is the request message transmitted by the UE after the UE has moved beyond the current RAN paging area, the request message may possibly need to carry information about a cell in which the UE resided previously. In this way, when the access network node by which the UE is served changes, the new access network node which has received the request message may find an original access network node (i.e., a first access network node).

Correspondingly, Step 32 may include: Step 321 of determining whether the UE is allowed to be in the RRC inactive state in accordance with the indication information; Step 322 of, when the UE is allowed to be in the RRC inactive state, determining the paging area for the UE; and Step 323 of, when the UE is not allowed to be in the RRC inactive state, transmitting an RRC inactive state deactivation message to the core network node, so that the core network node notifies the UE that the UE is not allowed to be in the RRC inactive state any longer.

In some possible embodiments of the present disclosure, Step 321 may include the following steps.

Step 3211: acquiring the information about the area in which the UE is allowed to be in the RRC inactive state in accordance with the indication information.

To be specific, Step 3211 may include: transmitting a request to the first access network node so as to acquire the information about the area in which the UE is allowed to be in the RRC inactive state; or transmitting a request to the core network node so as to acquire the information about the area in which the UE is allowed to be in the RRC inactive state.

It should be appreciated that, the first access network node may refer to an access network node by which the UE was served, i.e., an original access network. During the implementation, the current access network node may acquire the original access node in accordance with the information about the cell in which the UE resided previously.

Step 3212: determining whether the UE is allowed to be in the RRC inactive state in accordance with the information about the area in which the UE is allowed to be in the RRC inactive state.

It should be appreciated that, subsequent to Step 322, the method may further include transmitting a path switching request to the core network node, so that the core network node updates a user plane connection and a control plane connection between the access network node and the core network node for the UE.

It should be appreciated that, in this case, the access network node may directly transmit the paging area to the UE via an air-interface message.

Figure 8:
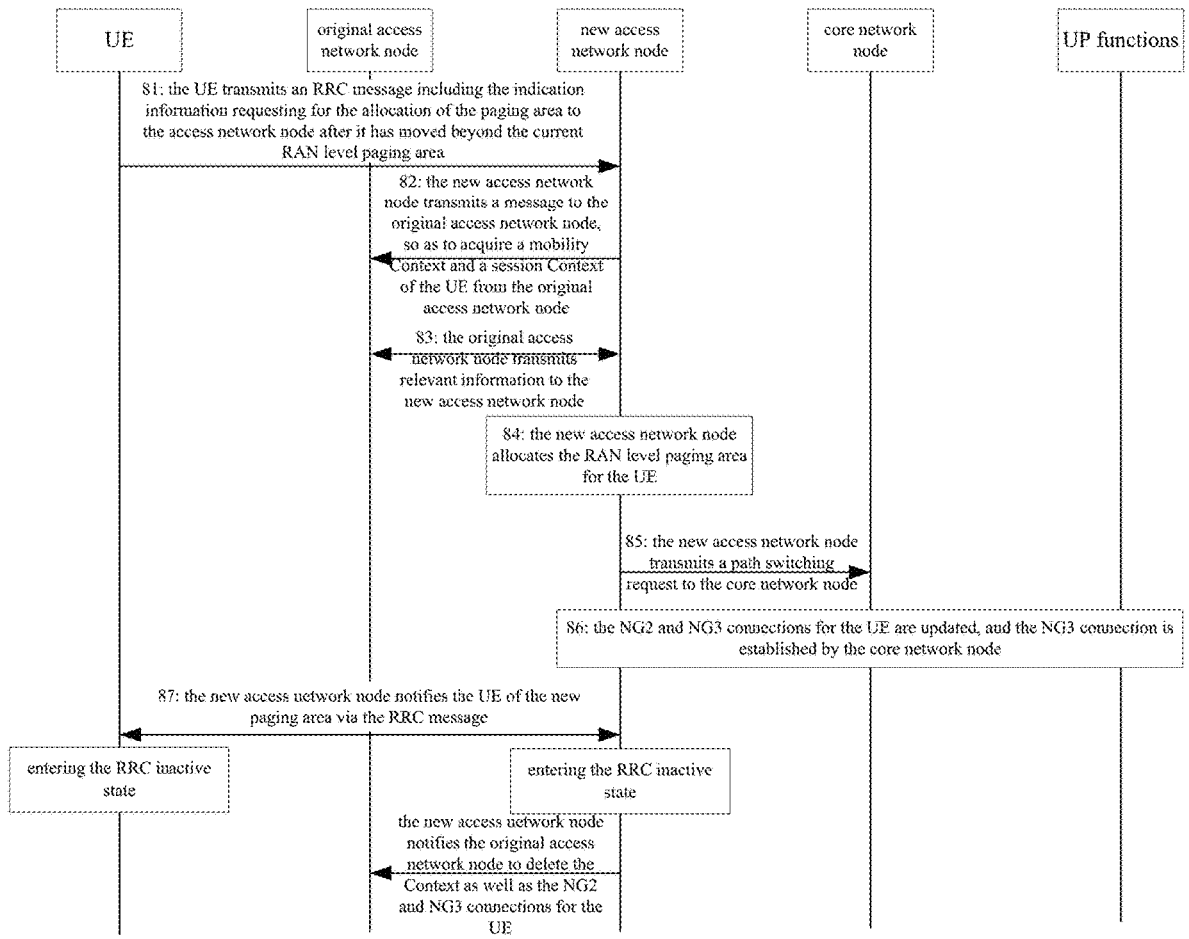
FIG. 8 is yet another schematic view showing the principal procedure of the reallocation of the RAN level paging area triggered directly by the UE when the UE has moved beyond the current RAN level paging area according to some embodiments of the present disclosure.

5. As shown in FIG. 8, a principal procedure of the reallocation of the RAN level paging area directly triggered by the UE when the UE has moved beyond the current RAN level paging area may include the following steps.

Step 81: after the UE has moved beyond the current RAN level paging area, the UE may transmit an RRC message requesting for the indication information indicating the allocation of the paging area to the access network node, so as to request the reallocation of the RAN level paging area. The indication information may carry an old cell Identifier (ID). When the RRC message is transmitted to the original access network node, the original access network node may reallocate the RAN level paging area, and notify the UE of it; otherwise, the following Step 82 may be performed.

Step 82: the new access network node may transmit a message to the original access network node, so as to request for an X2 switching procedure or a new UE context delivery procedure, thereby to acquire a mobility context and a session context of the UE from the original access network node. In addition, the original access network node may provide the RRC inactive state allowed area to the new access network node.

Step 83: the original access network node feed relevant information back to the new access network node.

Step 84: the new access network node may determine that the UE is allowed to be in the RRC inactive state in accordance with the RRC inactive state allowed area (e.g., when a serving area of the new access network node overlaps the RRC inactive state allowed area), allocate the UE-specific RAN level paging area for the UE, and determine that the UE is allowed to be in the RRC inactive connected state in the paging area. When the new RAN node determines that the UE is not allowed to be in the RRC inactive state any longer, the new RAN node may reject the UE's request, and indicate that the UE is not allowed to be in the RRC inactive state any longer.

Step 85: the new access network node may transmit a path switching request to the core network node.

Step 86: the NG2 and NG3 connections for the UE may be updated, and the NG3 connection may be established by the core network node.

Step 87: the new access network node may notify the UE of the new paging area via the RRC message, e.g., the RRC connection release message, so that the UE and the RAN node may enter the RRC inactive state after the release of the RRC connection.

Step 88: the new access network node may notify the original access network node to delete the context, the NG2 connection and the NG3 connection for the UE.

It should be appreciated that, when the core network node determines that the UE is not allowed to be in the RRC inactive state any longer (e.g., when the UE has moved beyond the RRC inactive state allowed area), the core network node may notify the original access network node to delete the context, the NG2 connection and the NG connection for the UE, transmit a position update acceptance massage to the new access network node, notify the new access network node that the UE is not allowed to be in the RRC inactive state continuously, and probably allocate a new TA list.

It should be appreciated that, according to the embodiments of the present disclosure, the RAN level paging area for the UE may be determined in accordance with the indication information indicating the allocation of the paging area for the UE. As a result, it is able to determine the RAN level paging area for the UE in the RRC inactive state, thereby to ensure the integrity of the network communication.

Figure 9:
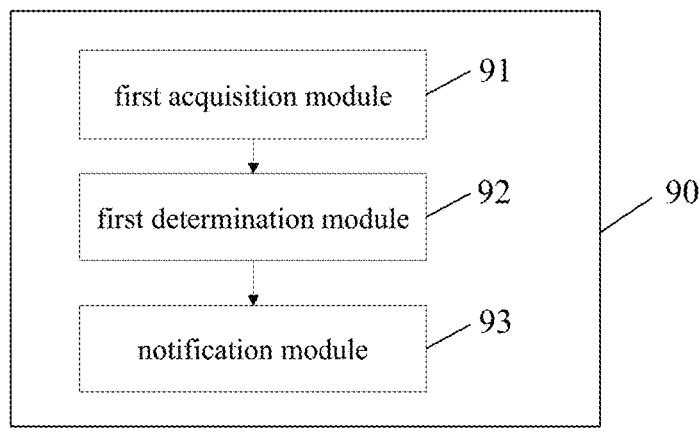
FIG. 9 is a schematic view showing the access network node according to some embodiments of the present disclosure.

As shown in FIG. 9, the present disclosure further provides in some embodiments an access network node 90, which includes: a first acquisition module 91 configured to acquire indication information indicating the allocation of the paging area for a UE; a first determination module 92 configured to determine the paging area for the UE in accordance with the indication information; and a notification module 93 configured to notify the UE of the paging area.

In some possible embodiments of the present disclosure, the indication information is information about an area in which the UE is allowed to be in an RRC inactive state, or an indication indicating that the UE is allowed to be in the RRC inactive state.

To be specific, when the indication information is the indication indicating that the UE is allowed to be in the RRC inactive state, the first determination module 92 is configured to determine a cell-granularity-based paging area for the UE in accordance with the indication indicating that the UE is allowed to be in the RRC inactive state.

In some possible embodiments of the present disclosure, when the indication information is the information about the area in which the UE is allowed to the in the RRC inactive state, the first determination module 92 is configured to determine a cell-granularity-based paging area for the UE in accordance with the information about the area in which the UE is allowed to be in the RRC inactive state, and the determined cell-granularity-based paging area may be included in the area in which the UE is allowed to be in the RRC inactive state.

To be specific, the first determination module is further configured to: acquire network deployment and configuration at the access network node as well as information about a mobility feature of the UE; and determine the cell-granularity-based paging area for the UE in accordance with the network deployment and configuration as well as the information about the mobility feature of the UE.

In some possible embodiments of the present disclosure, the notification module 93 is further configured to directly transmit the paging area to the UE via an air-interface message.

In some possible embodiments of the present disclosure, the access network node 90 may further include a second determination module configured to, when the UE is connected to the access network node again, determine a new paging area for the UE.

In some possible embodiments of the present disclosure, the first acquisition module 91 is further configured to acquire the indication information indicating the allocation of the paging area for the UE which is transmitted by a core network node upon the receipt of a position update request from the UE.

Correspondingly, the notification module 93 is further configured to transmit the paging area to the core network node so that the core network node transmits the paging area to the UE, or directly transmit the paging area to the UE via an air-interface message.

In some possible embodiments of the present disclosure, the first acquisition module 91 is further configured to receive the indication information indicating the allocation of the paging area for the UE which is transmitted after the UE has moved beyond a current paging area.

Correspondingly, the first determination module 92 may include: a determination sub-module configured to determine whether the UE is allowed to be in the RRC inactive state in accordance with the indication information; and a first determination sub-module configured to, when the UE is allowed to be in the RRC inactive state, determine the paging area for the UE.

To be specific, the determination sub-module may include: an acquisition unit configured to acquire the information about the area in which the UE is allowed to be in the RRC inactive state in accordance with the indication information; and a determination unit configured to determine whether the UE is allowed to be in the RRC inactive state in accordance with the information about the area in which the UE is allowed to be in the RRC inactive state.

To be specific, the acquisition unit is further configured to transmit a request to a first access network node so as to acquire the information about the area in which the UE is allowed to be in the RRC inactive state, or transmit a request to the core network node so as to acquire the information about the area in which the UE is allowed to be in the RRC inactive state.

In some possible embodiments of the present disclosure, the first determination module 92 may further include a first transmission sub-module configured to, when the UE is not allowed to be in the RRC inactive state, transmit an RRC inactive state deactivation message to the core network node, so that the core network node notifies the UE that the UE is not allowed to be in the RRC inactive state any longer.

In some possible embodiments of the present disclosure, the access network node 90 may further include a first transmission module configured to transmit a path switching request to the core network node, so that the core network node updates a user plane connection and a control plane connection between the access network node and the core network node for the UE.

In some possible embodiments of the present disclosure, the notification module 93 is further configured to directly transmit the paging area to the UE via an air-interface message.

It should be appreciated that, the implementation of the access network node may refer to that of the method mentioned hereinabove, with a same technical effect.

Figure 10:
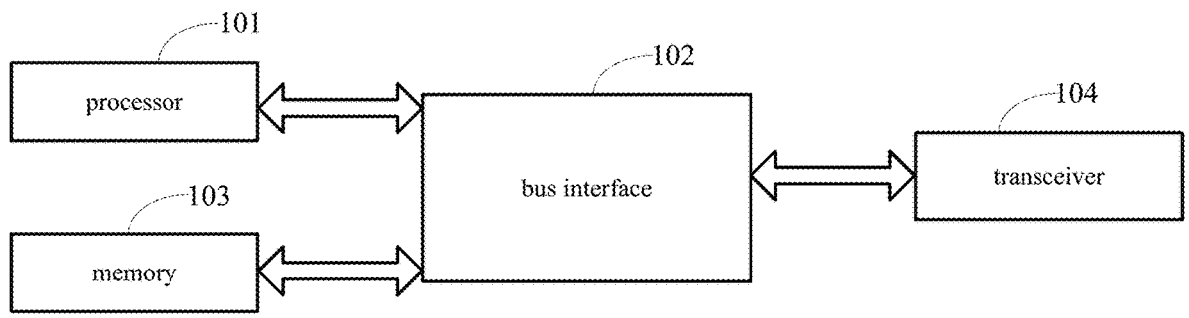
FIG. 10 is another schematic view showing the access network node according to some embodiments of the present disclosure.

As shown in FIG. 10, the present disclosure further provides in some embodiments an access network node, including a processor 101, and a memory 103 connected to the processor 101 via a bus interface 102. The memory 103 is configured to store therein programs and data for the operation of the processor 101. The processor 101 is configured to call and execute the programs and data stored in the memory 103, so as to: acquire indication information indicating the allocation of the paging area for a UE; determine the paging area for the UE in accordance with the indication information; and notify through a transceiver 104 the UE of the paging area.

It should be appreciated that, the processor 101 is further configured to achieve the function of any other module of the above-mentioned access network node.

It should be further appreciated that, the transceiver 104 is connected to the bus interface 102, and configured to notify the paging area to the UE under the control of the processor 101.

It should be further appreciated that, in FIG. 10, bus architecture may include a number of buses and bridges connected to each other, so as to connect various circuits for one or more processors 101 and one or more memories 103. In addition, as is known in the art, the bus architecture may be used to connect any other circuits, such as a circuit for a peripheral device, a circuit for a voltage stabilizer and a power management circuit. The bus interface may be provided, and the transceiver 104 may consist of a plurality of elements, i.e., a transmitter and a receiver for communication with any other devices over a transmission medium. The processor 101 may take charge of managing the bus architecture as well as general processings. The memory 103 may store therein data for the operation of the processor 101.

It should be further appreciated that, all or parts of the steps in the method may be implemented by hardware, or related hardware indicated by a computer program. The computer program includes instructions for executing all or parts of the above-mentioned steps. The computer program may be stored in a computer-readable storage medium in any appropriate form.

Figure 11:
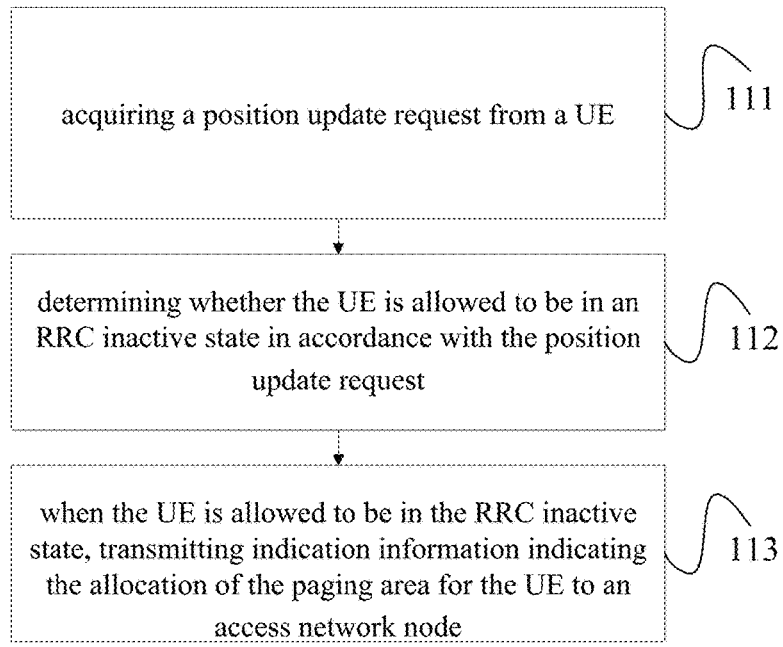
FIG. 11 is a flow chart of a method for determining a paging area according to some embodiments of the present disclosure.

As shown in FIG. 11, the present disclosure further provides in some embodiments a method for determining a paging area for use in a core network node, which includes: Step 111 of acquiring a position update request from a UE; Step 112 of determining whether the UE is allowed to be in an RRC inactive state in accordance with the position update request; and Step 113 of, when the UE is allowed to be in the RRC inactive state, transmitting indication information indicating the allocation of the paging area for the UE to an access network node.

To be specific, the indication information may include information about an area in which the UE is allowed to be in an RRC inactive state, or an indication indicating that the UE is allowed to be in the RRC inactive state.

In some possible embodiments of the present disclosure, Step 111 may include receiving the position update request from the UE after the UE has moved beyond a current paging area, and the indication information indicating that the UE has moved beyond the current paging area is carried in the position update request.

To be specific, when the indication information includes the information about the area in which the UE is allowed to be in the RRC inactive state, Step 113 may include: determining the information about the area in which the UE is allowed to be in the RRC inactive state; and transmitting the information about the area as the indication information indicating the allocation of the paging area for the UE to the access network node.

In some possible embodiments of the present disclosure, prior to Step 112, the method may further include: determining whether the UE is located in an area in which the UE is allowed to be in the RRC inactive state: when the UE is located in the area in which the UE is allowed to be in the RRC inactive state, proceeding to Step 112; and when the UE is located in an area in which the UE is not allowed to be in the RRC inactive state, transmitting a response message (e.g., a position update acceptance message) to the UE, so as to notify the UE that the UE is not allowed to be in the RRC inactive state any longer.

In some possible embodiments of the present disclosure, the method may further include: receiving the paging area from the access network node; and transmitting the paging area to the UE.

It should be appreciated that, the description about the core network node side in the above-mentioned embodiments concerning the method for use in the access network node may also applied to the method for use in the core network node, and thus will not be particularly defined herein.

Figure 12:
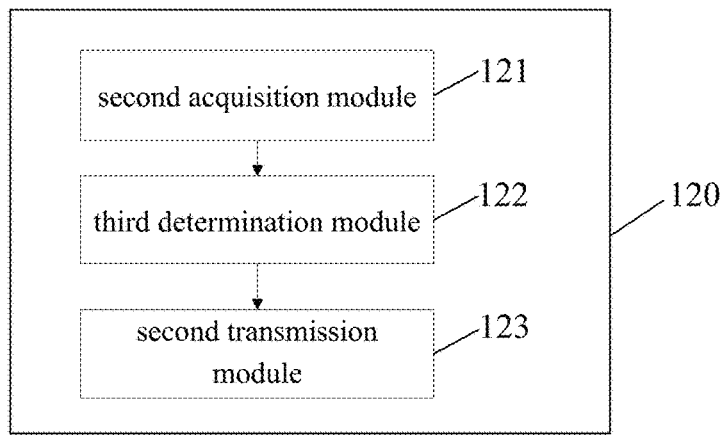
FIG. 12 is a schematic view showing the core network node according to some embodiments of the present disclosure.

As shown in FIG. 12, the present disclosure further provides in some embodiments a core network node 120 which includes: a second acquisition module 121 configured to acquire a position update request from a UE; a third determination module 122 configured to determine whether the UE is allowed to be in an RRC inactive state in accordance with the position update request; and a second transmission module 123 configured to, when the UE is allowed to be in the RRC inactive state, transmit indication information indicating the allocation of the paging area for the UE to an access network node.

To be specific, the indication information may include information about an area in which the UE is allowed to be in an RRC inactive state, or an indication indicating that the UE is allowed to be in the RRC inactive state.

In some possible embodiments of the present disclosure, the second acquisition module 121 is further configured to receive the position update request from the UE after the UE has moved beyond a current paging area, and the indication information indicating that the UE has moved beyond the current paging area is carried in the position update request.

In some possible embodiments of the present disclosure, when the indication information includes the information about the area in which the UE is allowed to be in the RRC inactive state, the second transmission module 123 may include: a second determination sub-module configured to determine the information about the area in which the UE is allowed to be in the RRC inactive state; and a second transmission sub-module configured to transmit the information about the area as the indication information indicating the allocation of the paging area for the UE to the access network node.

In some possible embodiments of the present disclosure, the core network node 120 may further include: a determination module configured to determine whether the UE is located in an area in which the UE is allowed to be e RRC inactive state; and a message returning module configured to, when the UE is located in an area in which the UE is not allowed to be in the RRC inactive state, transmit a response message to the UE, so as to notify the UE that the UE is not allowed to be in the RRC inactive state any longer. The third determination module is further configured to, when the UE is located in the area in which the UE is allowed to be in the RRC inactive state, determine whether the UE is allowed to be in the RRC inactive state in accordance with the position update request.

In some possible embodiments of the present disclosure, the core network node 120 may further include a reception module configured to receive the paging area from the access network node, and a third transmission module configured to transmit the paging area to the UE.

It should be appreciated that, the implementation of the core network node may refer to that of the method mentioned hereinabove, with a same technical effect.

Figure 13:
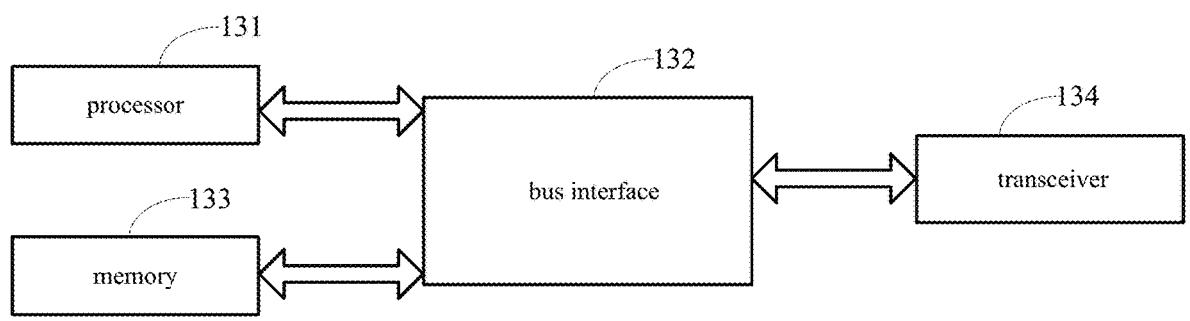
FIG. 13 is another schematic view showing the core network node according to some embodiments of the present disclosure.

As shown in FIG. 13, the present disclosure further provides in some embodiments a core network node, including a processor 131, and a memory 133 connected to the processor 131 via a bus interface 132. The memory 133 is configured to store therein programs and data for the operation of the processor 131. The processor 131 is configured to call and execute the programs and data stored in the memory 133, so as to: acquire a position update request from a UE; determine whether the UE is allowed to be in an RRC inactive state in accordance with the position update request;

and when the UE is allowed to be in the RRC inactive state, transmit through a transceiver 134 indication information indicating the allocation of the paging area for the UE to an access network node.

It should be appreciated that, the processor 131 is further configured to achieve the function of any other module of the above-mentioned core network node.

It should be further appreciated that, the transceiver 134 is connected to the bus interface 132, and configured to transmit the indication information about the allocation of the paging area for the UE to the access network node under the control of the processor 131.

It should be further appreciated that, in FIG. 13, bus architecture may include a number of buses and bridges connected to each other, so as to connect various circuits for one or more processors 131 and one or more memories 133. In addition, as is known in the art, the bus architecture may be used to connect any other circuits, such as a circuit for a peripheral device, a circuit for a voltage stabilizer and a power management circuit. The bus interface may be provided, and the transceiver 134 may consist of a plurality of elements, i.e., a transmitter and a receiver for communication with any other devices over a transmission medium. The processor 131 may take charge of managing the bus architecture as well as general processings. The memory 133 may store therein data for the operation of the processor 131.

It should be further appreciated that, all or parts of the steps in the method may be implemented by hardware, or related hardware indicated by a computer program. The computer program includes instructions for executing all or parts of the above-mentioned steps. The computer program may be stored in a computer-readable storage medium in any appropriate form.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for determining a paging area for use in an access network node, comprising:
   acquiring indication information indicating the allocation of the paging area for a User Equipment (UE);
   determining the paging area for the UE in accordance with the indication information; and
   notifying the UE of the paging area,
   wherein the acquiring the indication information indicating the allocation of the paging area for the UE comprises receiving the indication information indicating the allocation of the paging area for the UE which is transmitted after the UE has moved beyond a current paging area;
   wherein the determining the paging area for the UE in accordance with the indication information comprises:
   determining whether the UE is allowed to be in the RRC inactive state; and
   when the UE is allowed to be in the RRC inactive state, determining the paging area for the UE;
   wherein the determining whether the UE is allowed to be in the RRC inactive state comprises:
   acquiring the information about the area in which the UE is allowed to be in the RRC inactive state in accordance with the indication information; and
   determining whether the UE is allowed to be in the RRC inactive state in accordance with the information about the area in which the UE is allowed to be in the RRC inactive state,
   wherein the acquiring the information about the area in which the UE is allowed to be in the RRC inactive state in accordance with the indication information comprises:
   transmitting a request to a first access network node so as to acquire the information about the area in which the UE is allowed to be in the RRC inactive state; or
   transmitting a request to the core network node so as to acquire the information about the area in which the UE is allowed to be in the RRC inactive state.

2. The method according to claim 1, wherein the indication information is information about an area in which the UE is allowed to be in a Radio Resource Control (RRC) inactive state, or an indication indicating that the UE is allowed to be in the RRC inactive state.

3. The method according to claim 2, wherein when the indication information is the indication indicating that the UE is allowed to be in the RRC inactive state, the determining the paging area for the UE in accordance with the indication information comprises determining a cell-granularity-based paging area for the UE in accordance with the indication indicating that the UE is allowed to be in the RRC inactive state; or
   wherein when the indication information is the information about the area in which the UE is allowed to the in the RRC inactive state, the determining the paging area for the UE in accordance with the indication information comprises determining a cell-granularity-based paging area for the UE in accordance with the information about the area in which the UE is allowed to be in the RRC inactive state, and the determined cell-granularity-based paging area is comprised in the area in which the UE is allowed to be in the RRC inactive state.

4. The method according to claim 3, wherein the determining the cell-granularity-based paging area for the UE comprises:
   acquiring network deployment and configuration at the access network node as well as information about a mobility feature of the UE; and
   determining the cell-granularity-based paging area for the UE in accordance with the network deployment and configuration as well as the information about the mobility feature of the UE;
   wherein the notifying the UE of the paging area comprises directly transmitting the paging area to the UE via an air-interface message.

5. The method according to claim 2, wherein the acquiring the indication information indicating the allocation of the paging area for the UE comprises acquiring the indication information indicating the allocation of the paging area for the UE which is transmitted by a core network node upon the receipt of a position update request from the UE.

6. The method according to claim 5, wherein the notifying the UE of the paging area comprises:
   transmitting the paging area to the core network node so that the core network node transmits the paging area to the UE; or
   directly transmitting the paging area to the UE via an air-interface message.

7. The method according to claim 1, further comprising, when the UE is not allowed to be in the RRC inactive state, transmitting an RRC inactive state deactivation message to the core network node, so that the core network node notifies the UE that the UE is not allowed to be in the RRC inactive state any longer.

8. The method according to claim 1, wherein when the UE is allowed to be in the RRC inactive state, subsequent to determining the paging area for the UE, the method further comprises transmitting a path switching request to the core network node, so that the core network node updates a user plane connection and a control plane connection between the access network node and the core network node for the UE.

9. The method according to claim 1, wherein the notifying the UE of the paging area comprises directly transmitting the paging area to the UE via an air-interface message.

10. An access network node, comprising a processor, and a memory and a transceiver connected to the processor, wherein
the memory is configured to store therein programs and data for the operation of the processor, and
the processor is configured to call and execute the programs and data stored in the memory, so as to realize a method for determining a paging area for use in the access network node, comprising:
acquiring indication information indicating the allocation of the paging area for a User Equipment (UE);
determining the paging area for the UE in accordance with the indication information; and
notifying the UE of the paging area,
wherein the acquiring the indication information indicating the allocation of the paging area for the UE comprises receiving the indication information indicating the allocation of the paging area for the UE which is transmitted after the UE has moved beyond a current paging area;
wherein the determining the paging area for the UE in accordance with the indication information comprises:
determining whether the UE is allowed to be in the RRC inactive state; and
when the UE is allowed to be in the RRC inactive state, determining the paging area for the UE;
wherein the determining whether the UE is allowed to be in the RRC inactive state comprises:
acquiring the information about the area in which the UE is allowed to be in the RRC inactive state in accordance with the indication information; and
determining whether the UE is allowed to be in the RRC inactive state in accordance with the information about the area in which the UE is allowed to be in the RRC inactive state,
wherein the acquiring the information about the area in which the UE is allowed to be in the RRC inactive state in accordance with the indication information comprises:
transmitting a request to a first access network node so as to acquire the information about the area in which the UE is allowed to be in the RRC inactive state; or
transmitting a request to the core network node so as to acquire the information about the area in which the UE is allowed to be in the RRC inactive state.

11. The access network node according to claim 10, wherein the indication information is information about an area in which the UE is allowed to be in a Radio Resource Control (RRC) inactive state, or an indication indicating that the UE is allowed to be in the RRC inactive state.

12. The access network node according to claim 11, wherein when the indication information is the indication indicating that the UE is allowed to be in the RRC inactive state, the determining the paging area for the UE in accordance with the indication information comprises determining a cell-granularity-based paging area for the UE in accordance with the indication indicating that the UE is allowed to be in the RRC inactive state; or
wherein when the indication information is the information about the area in which the UE is allowed to the in the RRC inactive state, the determining the paging area for the UE in accordance with the indication information comprises determining a cell-granularity-based paging area for the UE in accordance with the information about the area in which the UE is allowed to be in the RRC inactive state, and the determined cell-granularity-based paging area is comprised in the area in which the UE is allowed to be in the RRC inactive state.

13. The access network node according to claim 12, wherein the determining the cell-granularity-based paging area for the UE comprises:
acquiring network deployment and configuration at the access network node as well as information about a mobility feature of the UE; and
determining the cell-granularity-based paging area for the UE in accordance with the network deployment and configuration as well as the information about the mobility feature of the UE;
wherein the notifying the UE of the paging area comprises directly transmitting the paging area to the UE via an air-interface message.

14. The access network node according to claim 11, wherein the acquiring the indication information indicating the allocation of the paging area for the UE comprises acquiring the indication information indicating the allocation of the paging area for the UE which is transmitted by a core network node upon the receipt of a position update request from the UE.

15. The access network node according to claim 14, wherein the notifying the UE of the paging area comprises:
transmitting the paging area to the core network node so that the core network node transmits the paging area to the UE; or
directly transmitting the paging area to the UE via an air-interface message.

16. The access network node according to claim 10, further comprising, when the UE is not allowed to be in the RRC inactive state, transmitting an RRC inactive state deactivation message to the core network node, so that the core network node notifies the UE that the UE is not allowed to be in the RRC inactive state any longer.

17. The access network node according to claim 10, wherein when the UE is allowed to be in the RRC inactive state, subsequent to determining the paging area for the UE, the method further comprises transmitting a path switching request to the core network node, so that the core network node updates a user plane connection and a control plane connection between the access network node and the core network node for the UE.

18. The access network node according to claim 10, wherein the notifying the UE of the paging area comprises directly transmitting the paging area to the UE via an air-interface message.

* * * * *